(12) United States Patent
Wilson et al.

(10) Patent No.: US 6,941,119 B2
(45) Date of Patent: Sep. 6, 2005

(54) REDUNDANCY SCHEME FOR THE RADIO FREQUENCY FRONT END OF A BROADBAND WIRELESS HUB

(75) Inventors: Eric K. Wilson, Cupertino, CA (US); Hillel Hendler, Jerusalem (IL)

(73) Assignee: Vyyo Ltd., Jerusalem (IL)

( * ) Notice: Subject to any disclaimer, the term of this patent is extended or adjusted under 35 U.S.C. 154(b) by 827 days.

(21) Appl. No.: 09/771,224

(22) Filed: Jan. 26, 2001

(65) Prior Publication Data

US 2001/0051512 A1 Dec. 13, 2001

Related U.S. Application Data

(60) Provisional application No. 60/178,154, filed on Jan. 26, 2000.

(51) Int. Cl.[7] .............................. H04B 1/04; H04B 7/14
(52) U.S. Cl. .......................... 455/132; 455/20; 455/423
(58) Field of Search ........................... 455/7, 8, 9, 11.1, 455/12.1, 20, 673.11, 422.1, 423, 424, 131, 132, 137, 232.1, 561

(56) References Cited

U.S. PATENT DOCUMENTS

| | | |
|---|---|---|
| 4,010,465 A | 3/1977 | Dodington et al. |
| 4,099,121 A | 7/1978 | Fang |
| 4,385,384 A | 5/1983 | Rosbury et al. |
| 5,052,024 A | 9/1991 | Moran, III et al. |
| 5,272,700 A | 12/1993 | Hansen et al. |
| 5,311,550 A | 5/1994 | Fouche et al. |
| 5,377,035 A | 12/1994 | Wang et al. |
| 5,408,349 A | 4/1995 | Tsushima et al. |
| 5,471,645 A | 11/1995 | Felix |
| 5,481,542 A | 1/1996 | Logston et al. |
| 5,481,561 A | 1/1996 | Fang |
| 5,487,099 A | 1/1996 | Maekawa |
| 5,510,859 A | 4/1996 | Douglass et al. |
| 5,557,612 A | 9/1996 | Bingham |
| 5,590,409 A | 12/1996 | Sawahashi et al. |
| 5,596,604 A | 1/1997 | Cioffi et al. |
| 5,606,664 A | 2/1997 | Brown et al. |
| 5,625,874 A | 4/1997 | Uchida et al. |
| 5,634,206 A | 5/1997 | Reed et al. |
| 5,666,646 A | 9/1997 | McCollum et al. |
| 5,724,385 A | 3/1998 | Levin et al. |
| 5,734,589 A | 3/1998 | Kostreski et al. |
| 5,740,525 A | 4/1998 | Spears |
| 5,752,161 A | 5/1998 | Jantti et al. |
| 5,796,783 A | 8/1998 | Crawford |

(Continued)

FOREIGN PATENT DOCUMENTS

| | | |
|---|---|---|
| CA | 2187141 | 4/1998 |
| EP | 0021 544 A1 | 1/1981 |
| EP | 0025 767 A1 | 3/1981 |

OTHER PUBLICATIONS

Golestani, S. (1995) "Network Delay Analysis on a Class of Fair Queueing Algorithms", *IEEE Journal of Selected Areas in Communication* 13(6):1057–1070.

Stiliadis, D. et al., (1998) "Rate–Proportional Servers: A Design Methodology for Fair Queueing Algorithms", *IEEE/ACM Transactions of Networking* 6(2):164–174.

(Continued)

*Primary Examiner*—Quochien B. Vuong
(74) *Attorney, Agent, or Firm*—John W. Carpenter; Reed Smith LLP

(57) ABSTRACT

A low cost redundancy scheme for the radio frequency front end of a wireless hub that requires a minimum number of down converters and upstream receivers to implement. The redundancy scheme may also be used as a back-up support for any upstream channel that is provided with a greater amount of data than the other upstream channels.

22 Claims, 6 Drawing Sheets

U.S. PATENT DOCUMENTS

| | | | |
|---|---|---|---|
| 5,809,090 | A | 9/1998 | Buternowsky et al. |
| 5,809,406 | A | 9/1998 | Taki et al. |
| 5,809,427 | A | 9/1998 | Perreault et al. |
| 5,818,825 | A | 10/1998 | Corrigan et al. |
| 5,831,690 | A | 11/1998 | Lyons et al. |
| 5,862,451 | A | 1/1999 | Grau et al. |
| 5,867,528 | A | 2/1999 | Verbueken |
| 5,896,414 | A | 4/1999 | Meyer et al. |
| 5,903,558 | A | 5/1999 | Jones et al. |
| 5,909,384 | A | 6/1999 | Tal et al. |
| 5,937,005 | A | 8/1999 | Obuchi et al. |
| 5,940,743 | A | 8/1999 | Sunay et al. |
| 5,963,843 | A | 10/1999 | Sit et al. |
| 5,963,870 | A | 10/1999 | Chheda et al. |
| 5,974,106 | A | 10/1999 | Dupont et al. |
| 5,978,855 | A | 11/1999 | Metz et al. |
| 5,991,286 | A | 11/1999 | Labonte et al. |
| 6,009,310 | A | 12/1999 | Motohashi |
| 6,018,644 | A * | 1/2000 | Minarik ............... 455/82 |
| 6,035,008 | A | 3/2000 | Kim |
| 6,052,408 | A | 4/2000 | Trompower et al. |
| 6,072,839 | A | 6/2000 | Mondal et al. |
| 6,075,787 | A | 6/2000 | Bobeck et al. |
| 6,111,887 | A | 8/2000 | Daily et al. |
| 6,112,232 | A | 8/2000 | Shahar et al. |
| 6,128,588 | A | 10/2000 | Chacon |
| 6,140,911 | A | 10/2000 | Fisher et al. |
| 6,141,356 | A | 10/2000 | Gorman |
| 6,157,311 | A | 12/2000 | Berkovich |
| 6,160,447 | A | 12/2000 | Huang |
| 6,172,970 | B1 | 1/2001 | Ling et al. |
| 6,185,227 | B1 | 2/2001 | Sipola |
| 6,195,697 | B1 | 2/2001 | Bowman-Amuah |
| 6,745,004 | B2 * | 6/2004 | Martin et al. ............ 455/12.1 |

OTHER PUBLICATIONS

Stiliadis, D. et al., (1998) "Efficient Fair Queuing Algorithms for Packet–Switched Networks", *IEEE/ACM Transactions of Networking* 6(2):175–185.

Data Over Cable Interface Specifications, Cable Modem Termination System–Network Side Interface Specification, SP–CMTS–NSII01–960702 (Jul. 2, 1996) pp. i–13.

Data–Over–Cable Service Interface Specifications, Cable Modem to Customer Premise Equipment Interface Specification. SP–CMC1–102–980317 (Mar. 17, 1998) pp. i–40.

Data–Over–Cable Service Interface Specifications, Radio Frequency Interface Specification, SP–RFI–I04–980724 (Jul. 24, 1998) pp. i–196.

Data–Over–Cable Service Interface Specifications, Operations Support System Interface Specification SP–OSSI–102–990113 (Jan. 13, 1999) pp. i–14.

Data–Over–Cable Service Interface Specifications, Operations Support System Interface Specification Radio Frequency Interface, SP–OSSI–RFI–103–990113 (Jan. 13, 1999) pp. i–29.

Data–Over–Cable Service Interface Specifications, Baseline Privacy Interface Specification, SP–BPI–102–990319 (Mar. 19, 1999) pp. i–88.

Data–Over–Cable Service Interface Specifications, Baseline Privacy Interface Specification, SP–BPI–102–990731 (Jul. 31, 1999) pp. i–160.

Data–Over–Cable Service Interface Specifications, Radio Frequency Interface Specification, SP–RFIv1.1–I03–991105 (Nov. 5, 1999) pp. i–366.

Data–Over–Cable Service Interface Specifications, Operations Support System Interface Specification SP–OSSIv1.1–D01–991115 (Nov. 15, 1999) pp. i–81.

Data–Over–Cable Service Interface Specifications, Operations Support System Interface Specification SP–OSSIv1.1–103–001220 (Dec. 20, 2000) p. ii.

* cited by examiner

REDUNDANCY SCHEME FOR THE RADIO FREQUENCY FRONT END OF A BROADBAND WIRELESS HUB

CROSS REFERENCE TO RELATED APPLICATION

This application claims priority to U.S. Provisional Patent Application entitled REDUNDANCY SCHEME FOR THE RADIO FREQUENCY FRONT END OF A BROADBAND WIRELESS HUB, filed Jan. 26, 2000, Application Ser. No. 60/178,154, the disclosure of which is herein incorporated by reference.

BACKGROUND OF THE INVENTION

1. Field of the Invention

The present invention relates generally to broadband wireless access systems, and more particularly to a redundancy scheme for a radio frequency front end in a broadband wireless access system.

2. Description of the Related Art

Point to multi-point fixed broadband wireless access systems over MMDS networks are currently known in broadcast situations. These networks operate over licensed bands including the MMDS band (2,150 to 2,162 MHz), the WCS band (2,305 to 2,360 MHz) and the ITFS/MMDS bands (2,500 to 2,686 MHz).

One known cable based broadband access system, which operates at a range of between 50 MHz and 864 MHz, but not in the MMDS, WCS, or ITFS/MMDS bands, is the data over cable specification system, which is specified in the Data Over Cable System Interface Specifications (DOCSIS), the disclosures of which are herein incorporated by reference. An overview of a DOCSIS system is depicted in FIG. 1. A Cable Modem Termination System (CMTS) 10 communicates with a wide area network 20, such as the Internet. The CMTS 10 can transmit signals from the wide area network 20 along a cable network 30 through cable modems 40 to a subscriber's LAN or computer 50. The subscriber's LAN or computer 50 data messages can be transmitted to the wide area network 20 through the cable modem 40 along the cable network 30 to the CMTS 10.

In point to multi-point broadband wireless access systems, one central end-point, e.g. the head-end, communicates through a bi-directional link or links with multiple end-points, e.g. the nodes. The number of nodes in communication varies in time and can be none, one or two or more at any specific time.

The link(s) between the head-end and the nodes are combined into one or more channels. The signal path from the central end-point to the nodes is referred to as downstream, while the signal path from the nodes to the central end-point is referred to as upstream.

A single upstream channel can be used to deliver information from a node to the head-end or from the head-end to a node or a group of nodes. If a single upstream channel is used for communication from the nodes(s) to the central point, then only one end-point can send information on the single upstream channel at any one time.

Wireless broadband access systems are also known in the art. One problem with many wireless receiver systems used in wireless broadband access systems is device failure in the components of the RF front end. This is an extremely significant problem for the wireless hub, where there are a number of receivers for each sector. Failure of an individual front end unit could render a whole sector useless.

Referring to FIG. 2, the downstream redundancy is based at the Wireless Modem Termination Station (WMTS), where two (2) or three (3) modulators 201(*a*)–(*c*) each connect to the same number of transmitters (up converters) 202(*a*)–(*c*), where each transmits in a separate downstream channel. This system may utilize a tuned combiner 203, to combine the signals from the transmitters 202(*a*)–(*c*). A power amplifier 204 drives the combined signal over the air. This configuration can also include an agile up converter as a backup (not shown). This system enables doubling of the downstream data rate for normal operation. In the case of failure (at a modulator or at a transmitter), the modem will stop receiving the particular frequency, and automatically will switch to a second frequency. The advantages of this approach include simplicity, doubling the downstream capacity in normal operation, the use of multiple downstream modulation schemes and/or bit rates, and optimization of the maximum capacity according to the receiving capabilities of the modem (distance, interference, multipath, etc.). Furthermore, it is advantageous to control the transmitter (frequency and power level) by the WMTS. For instance, an up converter transmitter manufactured by ADC, model 5100 (and others), has SNMP control.

In the system of FIG. 3, an upstream redundant front end scheme is shown. Failure in the upstream can be determined at the WMTS 304 end based on the failure to receive an answer from all the modems on a specific upstream frequency. The above concept enables self-redundancy and self-healing. Alternative failure decision criterion includes combining the RF test point signals from the transmitters, and connecting them to a special modem used for downstream "receive only" testing. This upstream criterion can be used together with the downstream criterion to distinguish between failure in the RF equipment or in the antenna(s) at the basestation.

Upstream coverage uses a sectorized antenna for reception (up to 24 sectors). Each receiving sector includes external equipment (antenna, band pass filter, low noise amplifier (LNA), down converter) and a receiver. Each sector can use multiple upstream frequencies, by splitting the received signal from the down converter, and delivering it to separate receivers at the WMTS (FIGS. 3 and 4 describe a basic configuration having four frequencies per sector). The WMTS includes eight upstream receiver cards, each of them including four receivers.

Referring now to FIG. 4, a front end receiver including full redundancy and antenna diversity is depicted. This configuration is based on the concept of delivering full redundancy without any point of failure. The schematic shown depicts a full redundancy configuration for four sectors. The configuration includes doubling the whole chain, from the antenna to the WMTS receiver, for each sector. The advantages of the scheme depicted in FIG. 4 include:

1. It enables implementation of antenna diversity (dual antennas per sector);
2. Full upstream redundancy, allowing the option of doubling upstream capacity (for high penetration);
3. No single point of failure, and ease of redundancy control (development of switching mechanism is not required).

However, the scheme of FIG. 4 includes several disadvantages including doubling the antenna weight and wind load required for construction of the tower (e.g. increasing the number of required antennas for 16 sectors) and most importantly the high cost due to the requirement of 32 down converters and antennas for 16 sectors.

It should be noted that in FIGS. 2, 3 and 4, the receivers are part of the WMTS, while the down converters are not.

SUMMARY OF THE INVENTION

In one embodiment the present invention provides for a low cost redundancy scheme for the radio frequency front end of a wireless hub that requires a minimum amount of down converters and upstream receivers to implement. The redundancy is based upon an implementation utilizing N+1 elements, e.g. downcoverters and upstream receivers, to provide full redundancy for N such elements. In parallel, the backup elements can be used to support another data stream.

Further, the low cost redundancy scheme described above can optionally be utilized with a LNA redundancy module.

In an additional embodiment, the present invention provides for an efficient low penetration scheme for the radio frequency front end of a wireless hub. This embodiment preferably utilizes as few down converters and upstream receivers as possible, thereby reducing cost

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method and system for a redundancy scheme for the radio frequency front end of a broadband wireless hub. Any and all such modifications, equivalents and alternatives are intended to fall within the spirit and scope of the present invention.

Figure 5:
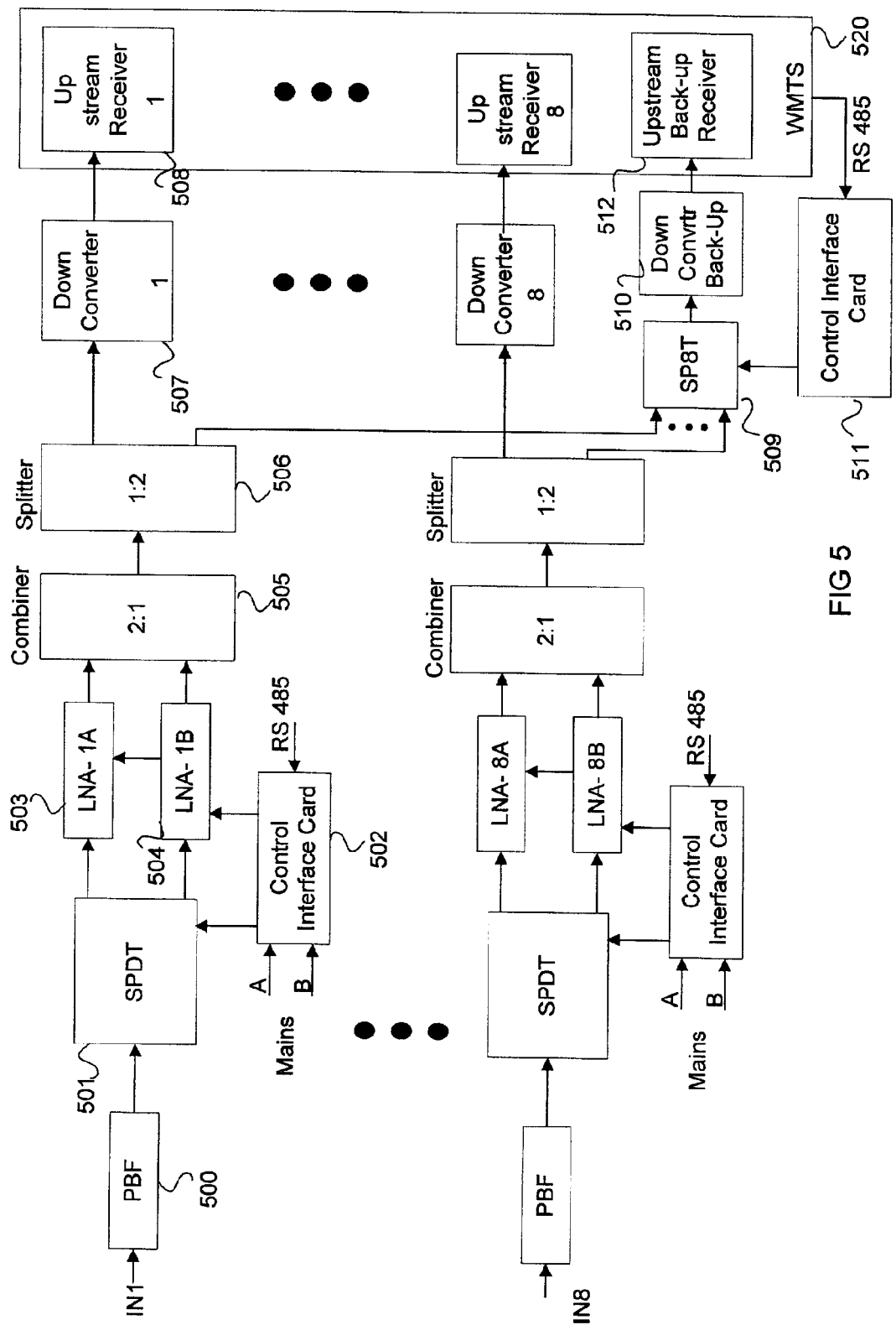
FIG. 5 is a block diagram of a redundancy scheme for a radio frequency front end according to a preferred embodiment of the resent invention.

Referring to FIG. 5, it is presently preferred that the front end RF redundancy system is split to two sections: LNA redundancy and down converter redundancy. It should be noted, however, that the front end RF redundancy can also be performed without using LNA redundancy by simply implementing the down converter redundancy depicted previously. If just the down converter redundancy is utilized, then one of the LNA's 504 and the combiner (2:1) 506 can be removed. While eight receiving chains are illustrated in FIG. 5, more or less may be implemented as desired. The following discussion focuses on the operation of one chain, but the operation of each chain is identical.

The LNA is more likely to become damaged due to external conditions, e.g. lightning, and therefore more likely to fail than the down converter. This is because it is located on the front end (except for a narrow band pass filter 500 between the antenna and the LNA). The LNA redundancy concept is based on using two LNAs 503, 504 for each antenna. The signal from the antenna is split by a mechanical SPDT switch 501, which has minimum loss (<0.4 dB) in order not to increase overall noise of the chain and should be highly reliable. The output of the two LNAs 503, 504 is connected to a low cost two-way combiner 505, which delivers signals to the down converter 507 via a splitter 506. The switching between the LNAs 503, 504 is done by switching the SPDT switch 501, and substantially at the same time controlling the DC voltage supplied to the appropriate LNA. This configuration enables "in operation" maintenance and replacement of the LNAs 503, 504. A Control Interface Card (or box) 502 which is controlled by the wireless hub accomplishes the switching between the two LNAs 503, 504. This card (or box) 502 is connected to the redundant LNA module (including two LNAs). The card 502 supplies the DC voltage to the two LNAs 503, 504, and a control bit to the SPDT switch 501. The interface between the card 502 and the wireless hub is a RS485 interface (or equivalent), for cases where the wireless hub is a far distance from the LNA.

The wireless hub controls the modules for each sector. The redundancy scheme is controlled by the wireless hub through the Control Interface Card (CIC). Failure is assumed to occur, when no received signal (or data) is received at the upstream receiver 508. In this case, the WMTS 520 will automatically switch between the LNAs 503, 504. This will be the first repair. If after this activity the received signal (or data) is still missing, the failure will be determined to be in the down converter 507 or in the receiver 508, and the wireless hub will operate the second stage of redundancy (described below).

In order to check the two LNAs, the wireless hub periodically switches between them. The switching for testing occurs infrequently without operation of the LNA and will preferably be switched between upstream bursts.

Referring again to FIG. 5, a down converter 507 is located in the receiving chain after the LNAs. It is presently preferred to be a block converter of 6 or 12 MHz (typical 12 MHz). Typically, there will be one down converter for each antenna sector. The down converter 507 preferably has a high dynamic range to eliminate interference (intermodulation), and has a very stable local oscillator with low phase noise. The local oscillator is preferably locked on a reference oscillator, perhaps derived from a GPS receiver which is part of the wireless hub.

Down converter and receiver redundancy in FIG. 5 is obtained by using a backup chain of one down converter 510 and one upstream receiver 512 as a backup for up to eight (or more) other receiving chains. In FIG. 5, each antenna has a first stage of redundancy for the LNA as is described above. A splitter 506 splits the output signal of the LNA redundancy module (two LNAs 503, 504 for each channel) and delivers the output signal of the LNA redundancy module signal to both a directly connected down converter 507 and to a backup down converter 510. A switch 509, preferably a SP8T switch, is used to route the output signal of the LNA redundancy module from the selected down converter 507 to the backup down converter 510 and upstream receiver 512. This switch 509 is controlled by the wireless hub, through a Control interface Card (CIC) 511. The CIC 511 is connected to the wireless hub by an RS485 or similar interface.

The detection of a failure will be made by the wireless hub. As has been described above, a failure decision will be made when no receiving signal (or data) occurs. In this case, the wireless hub will automatically switch to the alternate LNA. This will be the first fix. If after this activity the receiving signal is still missing, the failure will be indicated to be in the down converter 507 or in the receiver 508, and the wireless hub will operate the second stage of redundancy. By controlling the LNAs and switch 509, the signal will be sent to the backup down converter 510 and backup receiver 512.

An example of the utilization of the above described scheme can for example have 16 sectors in which case two switches, 18 down converters, and 18 upstream receivers will be used. For seven sectors, only two upstream receiver cards are needed. The backup upstream receivers are located on separate (or mixed) cards from the direct receivers, such that failure of any receiver card is fully backed up by the other cards (in a system including multi-channel cards).

Figure 1:
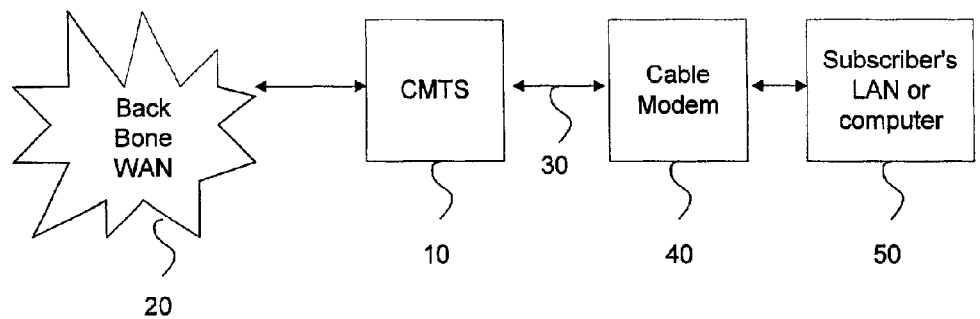
FIG. 1 is an overview of a prior art data over cable system.
Figure 2:
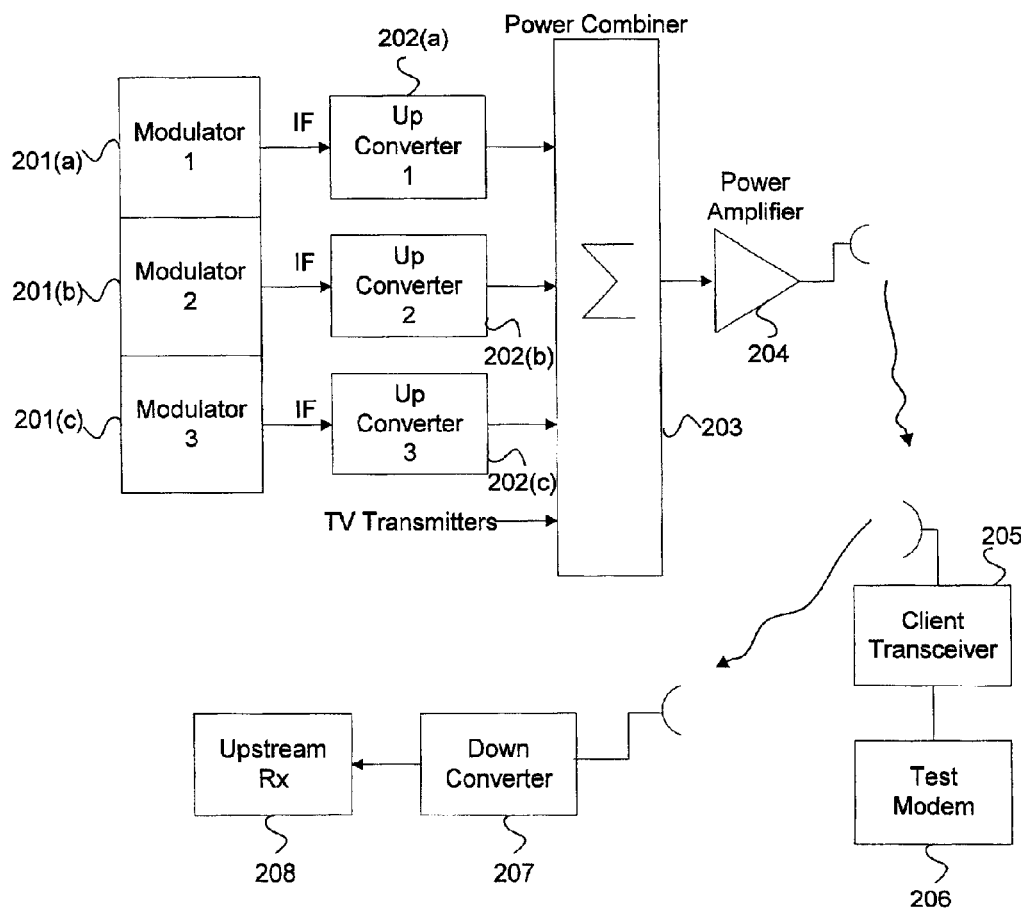
FIG. 2 is a block diagram of a known redundancy scheme for downstream communication in broadband wireless access network.
Figure 3:
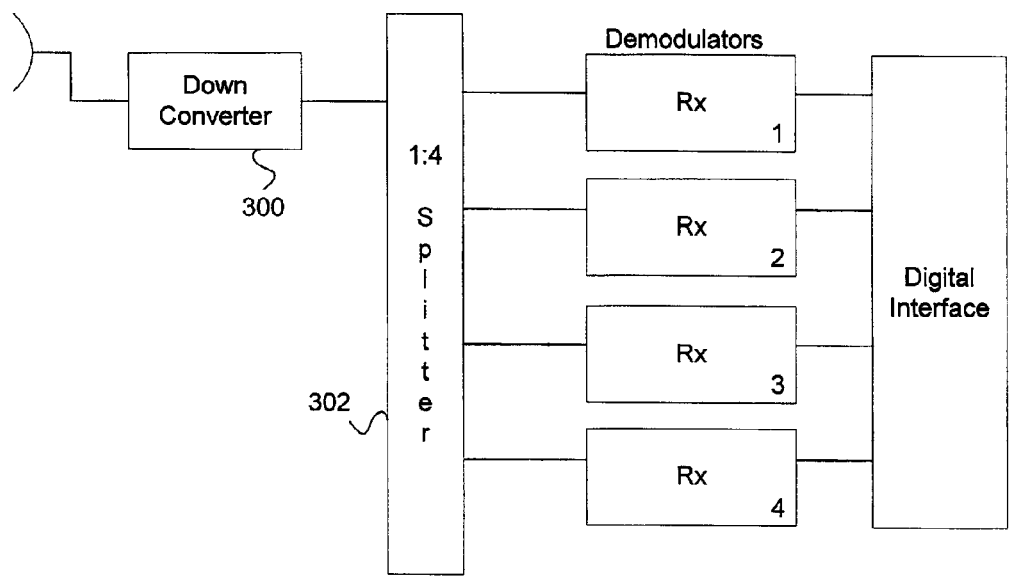
FIG. 3 is a block diagram of known upstream receiving chain including a down converter and receiver.
Figure 3:
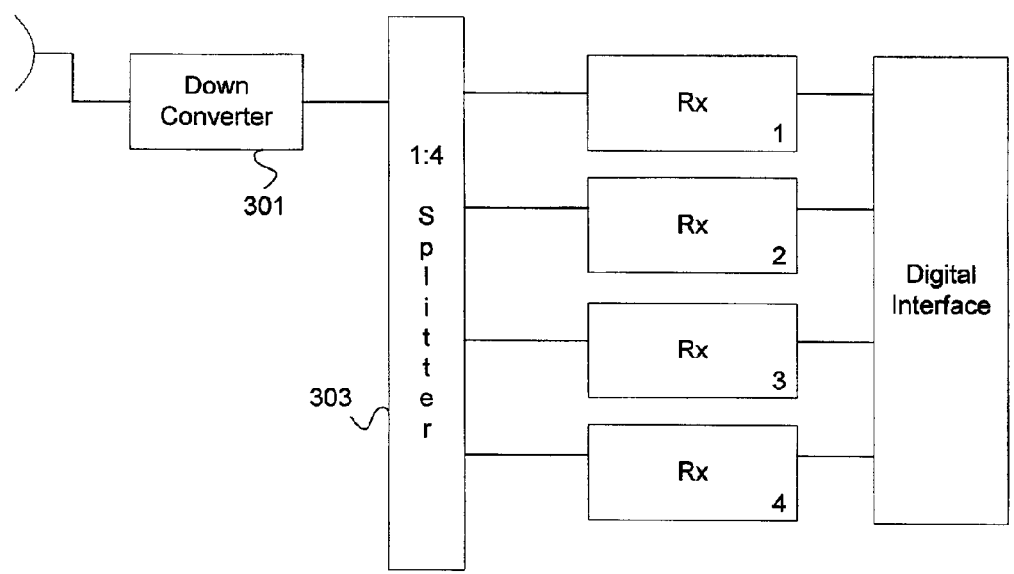

The above concept can be used with the scheme describe above with respect to FIG. 2 to deliver multiple upstream channels per sector, by splitting the signal from each down converter to several upstream receivers. The above concept can also be implemented with SP4T or SPDT switches for low penetration, when only four or two sectors are used.

An advantage of the above configuration is that is does not have any common points of failure. The splitter 506 is a passive unit, and is thus unlikely to fail. The switch 509 also has a very high affective MTBF (Mean Time Between Failure), and even if the switch 509 fails, the signal has a parallel path to the direct down converter. Other benefits of the embodiment include regular operations when no failure is detected, and the opportunity to use the backup chain (backup down converter and backup upstream receiver) to double the data capacity on any one of the sectors ad hoc. The backup chain can be used on a separate frequency, and dynamically routed to support the busiest of the other sectors.

Figure 4:
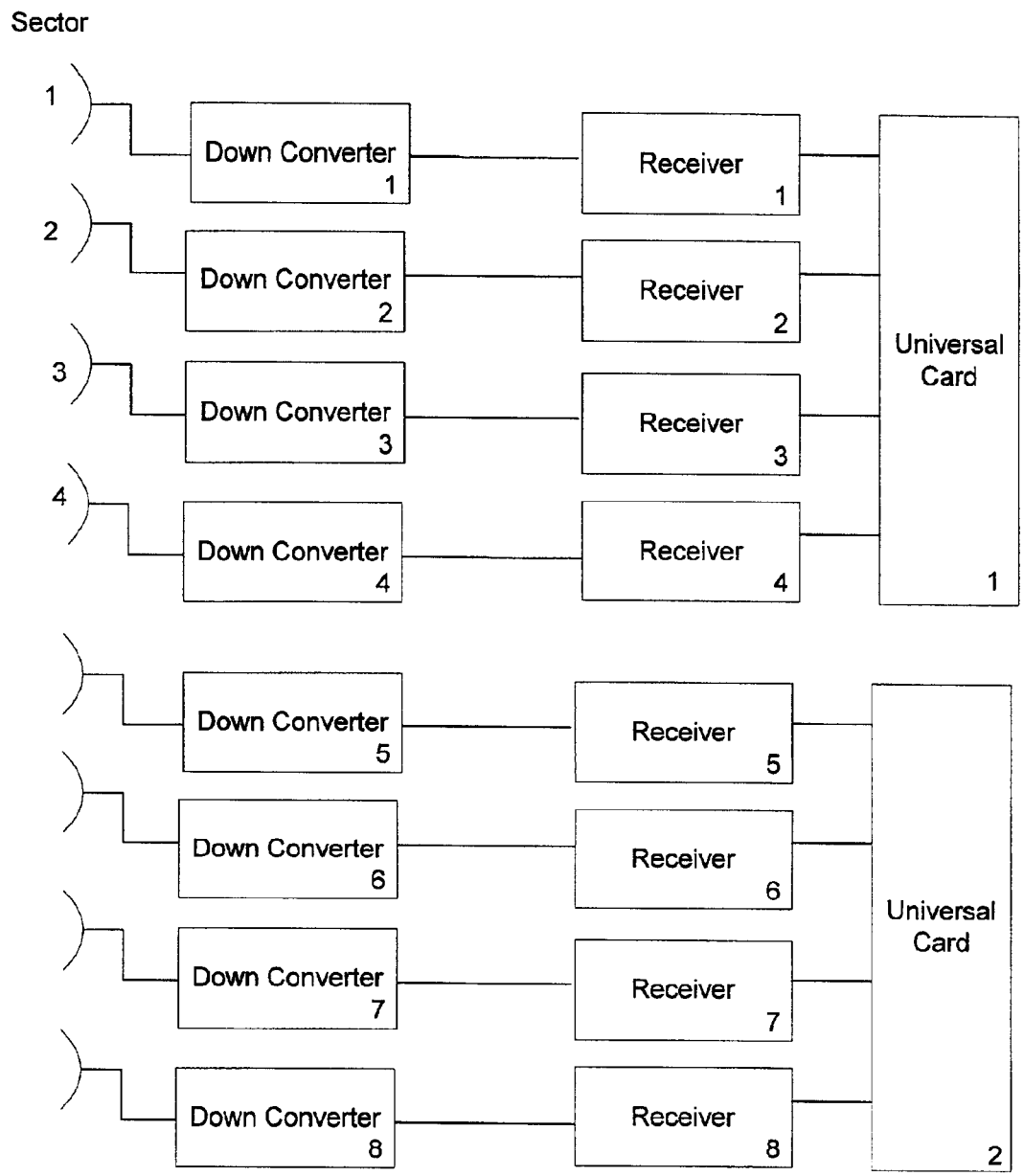
FIG. 4 is a block diagram of known upstream redundancy scheme for a radio frequency front end.

The added cost for redundancy for eight sectors is only an additional 8-way low cost splitter, a down converter, a switch, a CIC (Control Interface Card), and an upstream receiver, which can be used for doubling the capacity of one sector. This system is thus far less expensive than the additional equipment costs described with respect to the system of FIG. 4.

Since one of the goals of the redundancy concept is to minimize the number of down converters at the wireless hub, this in turn reduces the cost of the wireless hub. To further reduce costs, it is preferred that the down converters are integrated with the wireless hub. This has the following advantages: better failure diagnostic and redundancy schemes by allowing greater control and probing of the down converter by the wireless hub; higher dynamic range with a gain controlled by the wireless hub for better matching of the input level range to the receiver, and lower cost.

Figure 6:
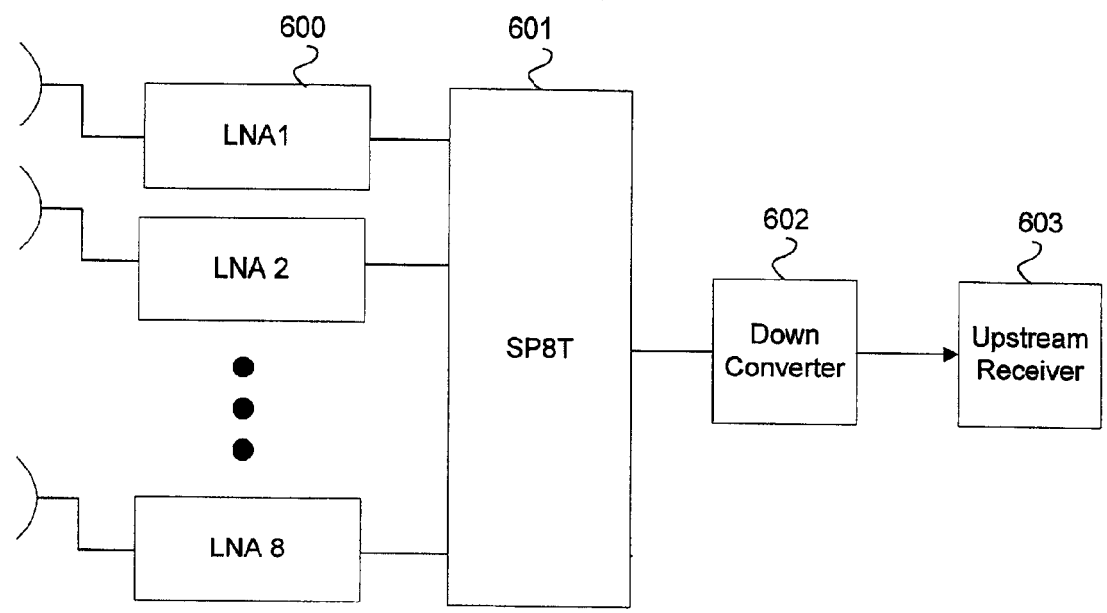
FIG. 6 is a block diagram of a radio frequency front for a low penetration broadband wireless access system according to a preferred embodiment of the present invention.
Figure 7:
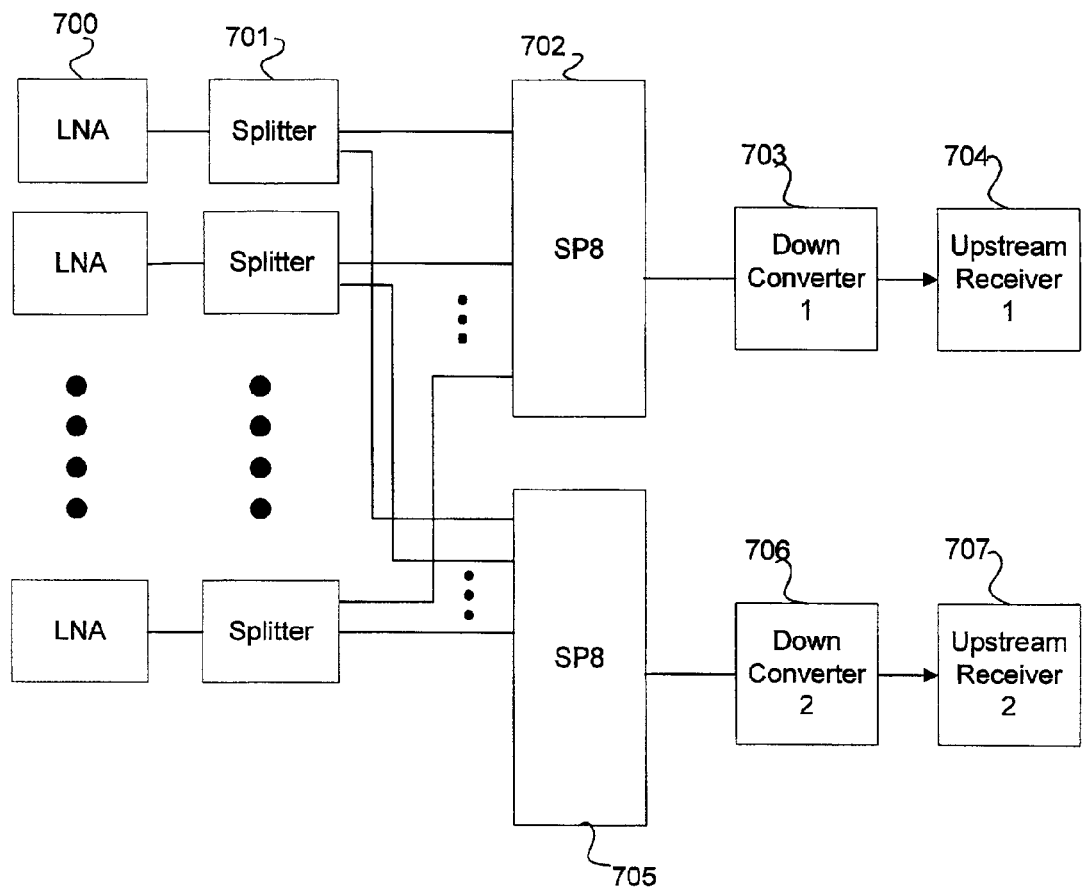
FIG. 7 is a block diagram of a redundancy scheme for a radio frequency front end for a low penetration wireless broadband access system according to a preferred embodiment of the present invention.

Referring now to FIGS. 6 and 7, a low penetration configuration is based on an architecture similar to the one described with respect to FIG. 5. The low penetration configuration enables a low cost solution with or without redundancy. This configuration is based on time sharing of the down converter and receiver for the low penetration period. The configuration can be expanded to the high penetration configuration when it is needed, using the same redundancy elements as described with respect to FIG. 5.

A configuration for low penetration should be low cost, but should also have the basic elements and allow for simple expansion capability, with no reduction in performance. The present scheme involves the use of sectorized antennas and the same number of LNAs, but only one down converter 703 (or two 706 for redundancy) and one or two upstream receivers 704, 707. Using eight antennas (and eight LNAs), instead of one omni antenna, improves the signal to noise ratio by about 9 dB, and enables reception from a longer distance (the same distance that will be used for high penetration conditions).

For an eight sector antenna, a switch 702, preferably a SP8T switch, is used to route the received signal from the eight LNAs to the down converter 703. The switching is preferably enabled on a burst by burst basis, or by gathering in time the bursts from some customers in the same sector. The wireless hub controls when the upstream bursts are assigned a time slot via the same Control Interface Card (CIC) that is used for the high penetration redundancy. The redundancy for the embodiments of FIGS. 6 and 7 are performed separately for the LNA and for the upstream receiver as was described with respect to FIG. 5.

The added cost for a single sector is an antenna and the LNA(s), but these elements are also used when moving to high penetration, and they deliver better signal to noise ratios without higher cost. The added cost of the switch 705 can be offset, because it can be used for redundancy later at high penetration periods as was described before. The cost savings includes the cost of the seven down converters which are needed for high penetration, eight sectors and an upstream receiver card.

Furthermore, an advantage of the schemes described with reference to FIGS. 6 and 7 is that it is easy to install many additional demodulation channels, thereby increasing the capacity in a relatively short time.

The systems in FIGS. 5 through 7 operate according to the DOCSIS specifications which are incorporated herein by reference in their entirety as if fully set forth herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for providing redundancy in a wireless hub, comprising:
   receiving a plurality of upstream signals;
   amplifying each upstream signal with a separate low noise amplifier;
   down converting the output of each of the low noise amplifier by utilizing a separate down converter;
   receiving a down converted signal from each down converter with a separate receiver;
   providing a data signal from a receiver;
   when no data signal is provided by one of the receivers, selecting an alternate low noise amplifier to amplifier the associated upstream signal; and
   when no data signal is provided by one of the receivers after selecting an alternate low noise amplifier, providing the output of the low alternate noise amplifier associated with the receiver to a redundant down converter, the redundant down converter providing a redundant down converted signal to a redundant receiver.

2. The method according to claim 1, wherein the wireless hub is part of a system comprising N +1 downconverters and upconverters elements that provide full redundancy for N of the elements.

3. The method according to claim 1, further comprising the step of utilizing a redundant converter to increase bandwidth of a selected channel of the wireless hub on an ad hoc basis.

4. The method according to claim 1, wherein the wireless hub is a hub in a broadband wireless access system.

5. The method according to claim 1, wherein said step of receiving comprises receiving the plurality of upstream signals from an antenna via a splitter that feeds the plurality of upstream signals to each of the low noise amplifiers.

6. The method according to claim 5, wherein the splitter comprises a passive unit splitter.

7. The method according to claim 1, wherein the plurality of upstream signals are received on a sectorized antenna of the wireless hub.

8. The method according to claim 1, further comprising the step of replacing the separate low noise amplifiers while the upstream signals are being processed by the alternate and redundant components of the wireless hub.

9. The method according to claim 1, further comprising the step of replacing, in order, each of the separate low noise amplifiers, separate downconverters, and separate receivers while the upstream signals are being processed by the alternate and redundant components of the wireless hub.

10. The method according to claim 1, further comprising the step of periodically switching between low noise amplifiers for testing purposes.

11. The method according to claim 10, wherein said step of periodically switching comprises switching between upstream bursts.

12. The method according to claim 1, wherein at least one of the downconverters comprises an oscillator locked on to a reference oscillator derived from a Global Positioning System (GPS) receiver in the wireless hub.

13. The method according to claim 1, wherein the alternate and redundant components of the wireless hub are used on an ad hoc basis to increase bandwidth of the wireless hub.

14. A method for low penetration redundancy, the method comprising:

receiving a plurality of upstream signals;

amplifying each upstream signal with a separate low noise amplifier;

splitting each amplified signal into two signals;

down converting the output of each of the low noise amplifier with a single down converter;

receiving a down converted signal from the down converter with a single receiver;

time sharing the down converter and receiver during a low penetration period;

providing a data signal from the receiver; and when no data signal is provided by the receiver when receiving a signal from one of the low noise amplifiers, providing the output of the low noise amplifier to a redundant down converter, the redundant down converter providing a redundant down converted signal to a redundant receiver.

15. The method according to claim 14, wherein the low penetration redundancy is implemented in conjunction with a wireless hub in a broadband wireless access system.

16. The method according to claim 14, wherein the step of splitting comprises splitting each amplified signal via a passive unit splitter.

17. The method according to claim 14, further comprising the step of utilizing a set of redundancy components to expand to a high penetration configuration when needed.

18. The method according to claim 14, wherein the method is implemented in a wireless hub having a sectorized antenna and corresponding LNAs, and utilizing only one downconverter during normal low penetration operations.

19. The method according to claim 18, wherein the sectorized antenna is a single omni antenna.

20. The method according to claim 18, wherein the sectorized antenna and corresponding LNAs comprise a set of antennas and an equal numbered set of LNAs.

21. The method according to claim 18, wherein the sectorized antenna and corresponding LNAs comprise a set of 8 antennas and 8 LNAs.

22. The method according to claim 14, wherein at least one of the downconverters comprises an oscillator locked on to a reference oscillator derived from a Global Positioning System (GPS) receiver in the wireless hub.

* * * * *